US008693225B2

(12) United States Patent
Yoshino et al.

(10) Patent No.: US 8,693,225 B2
(45) Date of Patent: Apr. 8, 2014

(54) ELECTRIC LOAD DRIVING CIRCUIT

(75) Inventors: Hiroyuki Yoshino, Matsumoto (JP); Nobuaki Azami, Matsumoto (JP); Shinichi Miyazaki, Suwa (JP); Kunio Tabata, Shiojiri (JP); Atsushi Oshima, Shiojiri (JP); Noritaka Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 12/605,475

(22) Filed: Oct. 26, 2009

(65) Prior Publication Data

US 2010/0102882 A1 Apr. 29, 2010

(30) Foreign Application Priority Data

Oct. 27, 2008 (JP) ................................ 2008-275234

(51) Int. Cl.
*H02J 1/10* (2006.01)

(52) U.S. Cl.
USPC ........................................................... 363/65

(58) Field of Classification Search
USPC .......... 363/43, 64, 65, 84; 307/43, 44, 48, 49, 307/64–66, 140; 320/166, 167
See application file for complete search history.

(56) References Cited

U.S. PATENT DOCUMENTS

| | | | | |
|---|---|---|---|---|
| 5,473,526 A * | 12/1995 | Svensson et al. | ............... | 363/60 |
| 6,621,273 B2 * | 9/2003 | Takada et al. | ................. | 324/433 |
| 8,013,574 B2 * | 9/2011 | Naganuma et al. | ........... | 320/118 |
| 2008/0122518 A1 * | 5/2008 | Besser et al. | .................. | 327/518 |
| 2008/0174275 A1 * | 7/2008 | Nakao | ........................... | 320/128 |

FOREIGN PATENT DOCUMENTS

| | | |
|---|---|---|
| JP | 2001-292507 A | 10/2001 |
| JP | 2003-285441 | 10/2003 |
| JP | 2007-301757 A | 11/2007 |

* cited by examiner

*Primary Examiner* — Adolf Berhane
*Assistant Examiner* — Yemane Mehari
(74) *Attorney, Agent, or Firm* — Maschoff Brennan

(57) ABSTRACT

An electric load driving circuit for driving an electric load having a capacity component includes a plurality of power sources generating different voltages, capacitors provided parallel to the plurality of power sources, a switch control unit that switches connections between the capacitors and the electric load and thereby switching a voltage applied to the electric load, discharge paths that enable discharging electric charge stored in the capacitor, and a discharge control unit that controls a quantity of electric charge discharged from the discharge paths.

8 Claims, 8 Drawing Sheets

FIG. 4A
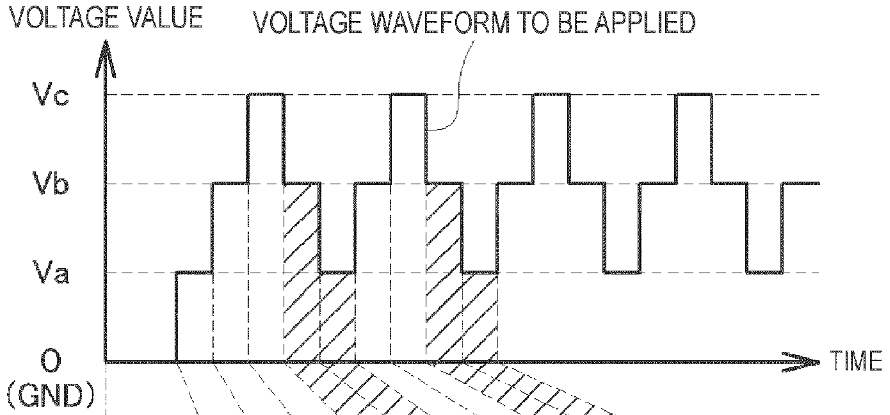
FIG. 4B
FIG. 4C
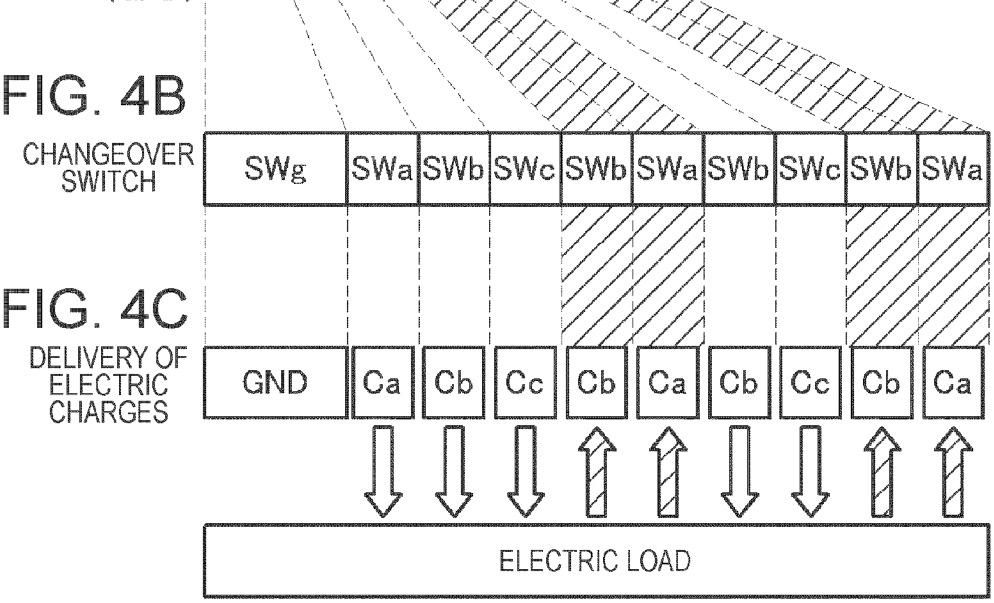
FIG. 4D
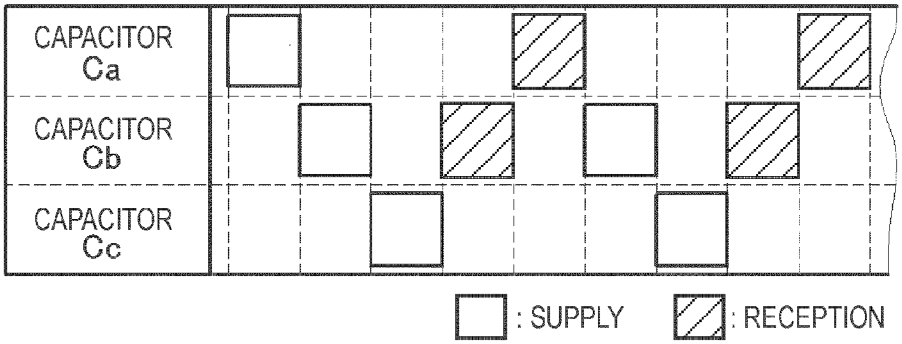

ELECTRIC LOAD DRIVING CIRCUIT

This application claims priority to Japanese Patent Application No. 2008-275234 filed on Oct. 27, 2008, and the entire disclosure thereof is incorporated herein by reference.

BACKGROUND

1. Technical Field

The present invention relates to a technique of applying a predetermined voltage waveform to an electric load having a capacity component and thus driving the electric load.

2. Related Art

Various types of electric loads driven by the application of a voltage are known and there are a number of electric loads having a capacity component such as a so-called piezoelectric element and a liquid crystal screen. In an electric load having a capacity component, the applied voltage rises as electric charges are supplied to the load, whereas the applied voltage decreases as electric charges are discharged from the load. Therefore, if a capacitor is used when driving a load having a capacity component, the load can be efficiently driven. That is, in the case of lowering the applied voltage, electric charges stored in the load are collected and stored in the capacitor. Then, at the time of raising the applied voltage, the electric charges stored in the capacitor are supplied to the load to raise the applied voltage. In this manner, the applied voltage to the load can be raised without supplying power to the load from a power source.

Of course, if the applied voltage to the load exceeds the terminal voltage of the capacitor, electric charges cannot be supplied from the capacitor. Therefore, the applied voltage to the load cannot be raised to the terminal voltage of the capacitor or higher. Thus, a technique of efficiently driving a load having a capacity component with as little power supply as possible from a power source is proposed in which plural capacitors having different terminal voltages are provided and then capacitors to connect to the load are switched one after another, as disclosed in JP-A-2003-285441.

In the proposed technique, a power source and plural capacitors are connected to each other and each capacitor is charged in advance so that the capacitors have different terminal voltages from each other. Then, in the case of raising the applied voltage to the load, capacitors to connect to the load are switched from a capacitor having a low terminal voltage to a capacitor having a high terminal voltage. Thus, the applied voltage to the load can be raised without supply of power from the power source. On the other hand, in the case of lowering the applied voltage to the load, a capacitor having a terminal voltage that is slightly lower than the applied voltage is connected to the load and electric charges accumulated in the load are shifted to the capacitor. Thus, the applied voltage to the load is lowered.

As the applied voltage is consequently lowered to the terminal voltage of the capacitor, the capacitor to connect to the load is switched to a capacitor having a slightly lower terminal voltage. As the capacitors are switched one after another in this manner and electric charges of the load are shifted to the capacitors, the applied voltage can be lowered. After that, in the case of raising the applied voltage again, by utilizing the electric charges thus stored in the capacitors, it is possible to efficiently drive the load having the capacity component without supplying power from the power source.

However, with the proposed technique, there are cases where the terminal voltage of a capacitor gradually rises while a voltage is applied to drive the load, making proper driving of the load difficult. For example, it is now assumed that the applied voltage is to be raised during the course of lowering the applied voltage by connecting a certain capacitor to the load and collecting electric charges. In this case, in order to raise the voltage to apply to the load, the capacitor is switched to a capacitor having a higher terminal voltage (or power source). Therefore, electric charges are one-sidedly accumulated in the capacitor connected to the load at the time of lowering the applied voltage. As this one-sided accumulation is repeated, the quantity of electric charges in the capacitor is increased and the terminal voltage rises accordingly. In this manner, depending on the waveform of a voltage applied to the load, the quantity of electric charges accumulated in the capacitor exceeds the quantity of electric charges discharged from the capacitor. Consequently, the terminal voltage of the capacitor may rise.

SUMMARY

An advantage of some aspect of the invention is to provide an electric load driving circuit which enables efficient and stable driving of an electric load having a capacity component while switching capacitors.

An electric load driving circuit according to an aspect of the invention is for driving an electric load having a capacity component. The electric load driving circuit includes, power sources generating different voltages, capacitors provided parallel to the power sources, a switch control unit that switches connections between the capacitors and the electric load and thereby switching a voltage applied to the electric load, discharge paths that enable discharging electric charge stored in the capacitors, and a discharge control unit that controls a quantity of electric charge discharged via the discharge paths.

In such an electric load driving circuit according to this aspect of the invention, a capacitor is provided parallel to each of the power sources generating different voltages and the capacitors have different terminal voltages from each other. As the connection between these capacitors and the electric load is switched, a voltage is applied to the electric load. That is, if a capacitor having a high terminal voltage is connected to the electric load, a high voltage is applied to the electric load. On the other hand, if a capacitor having a low terminal voltage is connected to the electric load, a low voltage is applied to the electric load. Each capacitor is provided with a discharge path capable of discharging electric charges without having to discharge via the electric load. Therefore, the quantity of electric charges discharged through each discharge path can be controlled.

Since the electric load has a capacity component, the previous applied voltage is still applied to the electric load immediately after the capacitors are switched. Therefore, if a state where the electric load is connected to a capacitor having a high terminal voltage and has a high applied voltage applied thereto is switched to the connection with a capacitor having a low terminal voltage, the voltage difference causes electric charges to flow into the capacitor from the electric load and the applied voltage to the electric load is lowered accordingly and eventually reaches the same voltage as the terminal voltage of the capacitor (that is, a state where the terminal voltage of the capacitor is applied). Meanwhile, in the case of raising the applied voltage to the terminal voltage of the capacitor from a state where a low voltage is applied to the electric load, electric charges stored in the capacitor are supplied to the electric load. Therefore, as long as the supply of electric charges from the capacitor to the electric load and the collection of electric charges from the electric load are balanced in the long run, no problem is caused.

However, depending on the voltage waveform applied to the electric load, this balance may be lost and the quantity of electric charges stored in the capacity may increase, causing a rise in the terminal voltage. Even in such cases, since the electric load driving circuit according to this aspect of the invention is provided with a discharge path for each capacitor, excessive electric charges are discharged not via the electric load and the rise in the terminal voltage of each capacitor is thus prevented. Therefore, switching the capacitors enables driving the load having the capacity component efficiently and stably.

In the electric load driving circuit according to this aspect of the invention, it is preferable that the terminal voltage of the capacitor is detected and the quantity of electric charges discharged from the capacitor is controlled in accordance with the result of the detection.

Thus, if the terminal voltage of the capacitor is raised, electric charges can be immediately discharged and the terminal voltage can be lowered. Moreover, excessive discharge of electric charges and hence excessive reduction in the terminal voltage can be avoided. Consequently, it is possible to supply an accurate voltage waveform and properly drive the electric load.

In the electric load driving circuit, it is also preferable that a voltage waveform is stored in advance, and that the connection between the plural capacitors and the electric load is switched in accordance with this voltage waveform and the quantity of electric charges discharged via the discharge path from each capacitor is controlled in accordance with this voltage waveform.

If the voltage waveform to apply to the electric load is predetermined, the quantity of electric charges stored in each capacitor can be estimated in advance, and when and how much electric charge should be discharged can be predicted. Therefore, by thus performing control to discharge the quantity of electric charges that is predicted in accordance with the voltage waveform to be applied, it is possible to avoid a rise in the terminal voltage of each capacitor and to drive the electric load with an accurate voltage waveform.

In the electric load driving circuit, it is also preferable that at least one of the discharge paths provided for the capacitors is a discharge path capable of discharging electric charges to another capacitor.

Even if one capacitor has excessive electric charges, another capacitor may lack electric charges. In such a case, if the discharge path of the capacitor having excessive electric charges is configured to be capable of discharging electric charges to the capacitor lacking electric charges, the excessive electric charges can be supplied to the other capacitor and therefore there is no need to supply electric charges from the power source. Consequently, the electric load can be driven more efficiently.

BRIEF DESCRIPTION OF THE DRAWINGS

The invention will be described with reference to the accompanying drawings, wherein like numbers reference like elements.

FIG. 4A to FIG. 4D are explanatory views showing a method in which the electric load driving circuit according to the embodiment drives the electric load.

DESCRIPTION OF EXEMPLARY EMBODIMENTS

Hereinafter, embodiments of the invention will be described in the following order.

A. Configuration of Electric Load Driving Circuit
B. Method of Driving Electric Load
C. Modifications
C-1. First Modified Embodiment
C-2. Second Modified Embodiment
C-3. Third Modified Embodiment

A. Configuration of Electric Load Driving Circuit

Figure 1:
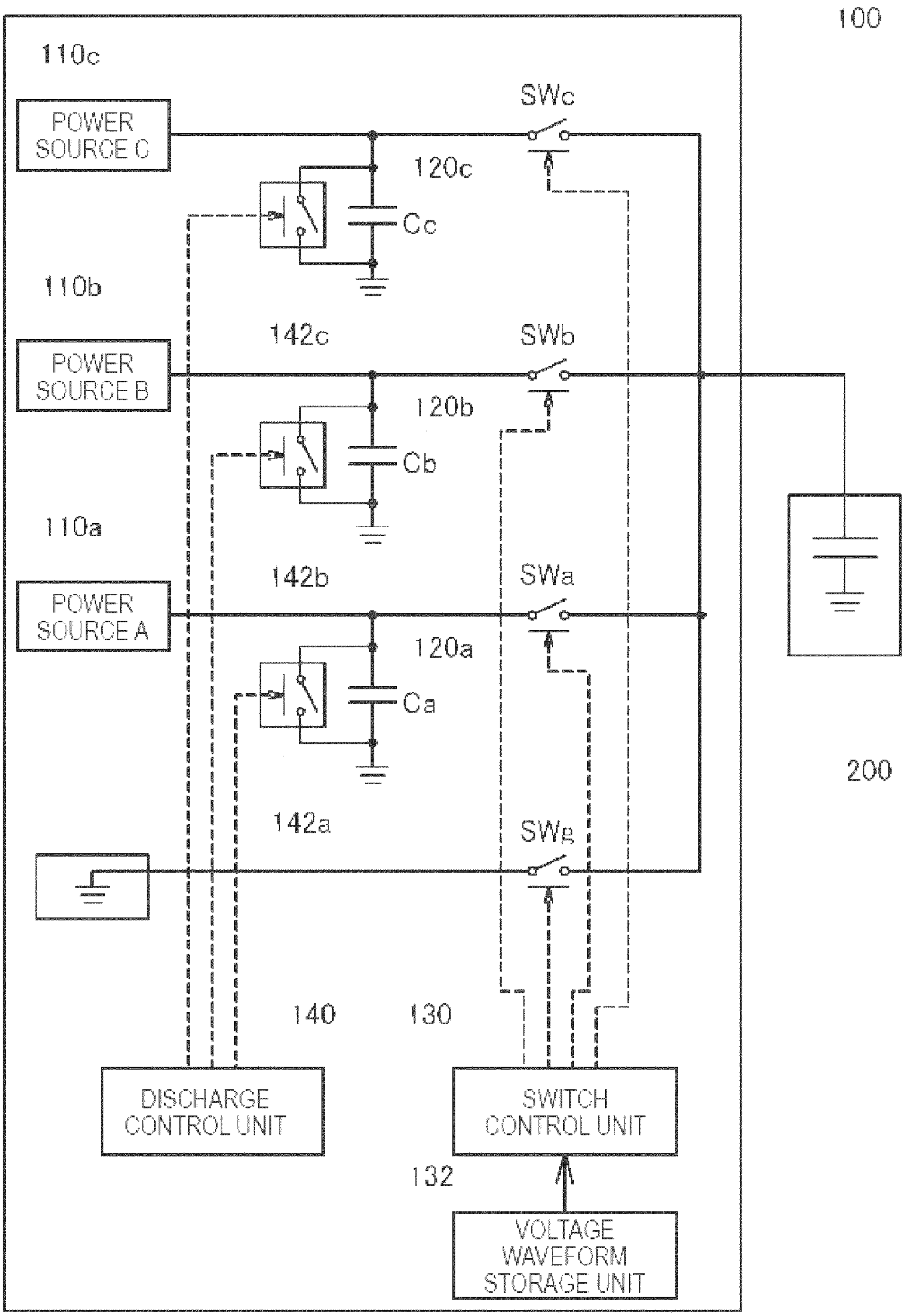
FIG. 1 is an explanatory view showing the configuration of an electric load driving circuit according to an embodiment of the invention.

FIG. 1 is an explanatory view showing the configuration of an electric load driving circuit 100 according to this embodiment. As shown in FIG. 1, the electric load driving circuit 100 has power sources 110*a*, 110*b* and 110*c*. These power sources generate different voltages from each other. Capacitors 120*a*, 120*b* and 120*c* are connected parallel to the power sources 110*a*, 110*b* and 110*c*, respectively. If the terminal voltage of a capacitor is lowered, electric charges are immediately supplied from the power source. The terminal voltages of the capacitors 120*a*, 120*b* and 120*c* can be connected to an electric load 200 via switches SWa, SWb and SWc, respectively. Also, the ground can be connected to the electric load 200 via a switch SWg.

These switches SWa, SWb, SWc and SWg are controlled by a switch control unit 130. As ON/OFF operation of each switch is controlled, the voltage applied to the electric load 200 can be switched. The switch control unit 130 includes a computer, a logic circuit or the like. In accordance with information about a voltage waveform read out from a voltage waveform storage unit 132 including a ROM, ON/OFF operation of the switches SWa, SWb, SWc and SWg is switched.

As shown in FIG. 1, in the electric load driving circuit 100 of this embodiment, discharge circuits 142*a*, 142*b* and 142*c* for connecting the terminals of the capacitors 120*a*, 120*b* and 120*c* to the ground and discharging electric charges stored in the capacitors are provided for each capacitor. In the example shown in FIG. 1, a switch is incorporated in the discharge circuits 142*a*, 142*b* and 142*c*. As the switches are controlled by a discharge control unit 140, the quantity of electric charges discharged from each capacitor can be controlled. The discharge control unit 140 can include a computer, a logic circuit or the like, similarly to the switch control unit 130.

As the electric load 200, various loads can be used as long as they are electric loads having a capacity component. For example, electric devices using a piezoelectric element as an actuator such as an ejection head of an ink jet printer, and electric devices in which fine wirings are laid vertically and horizontally in order to drive multiple pixels such as a liquid crystal screen and an organic EL (electroluminescence) screen have a large capacity component. Therefore, these devices can be preferably used.

Figure 2:
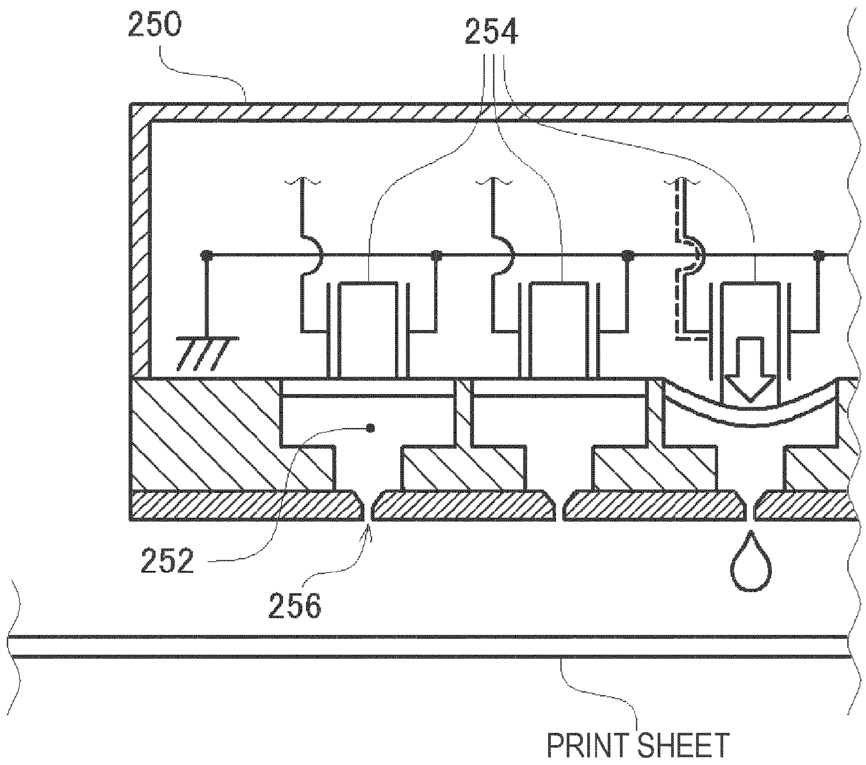
FIG. 2 is an explanatory view showing the internal structure of an ejection head of an ink jet printer as an electric load having a capacity component.

FIG. 2 is an explanatory view showing the internal structure of an ejection head 250 of an ink jet printer as a typical electric load having a capacity component. As shown in FIG. 2, inside the ejection head 250, plural small ink chambers 252 that store ink are provided. A fine ink nozzle 256 is formed in the bottom of each ink chamber 252. A piezoelectric element 254 is provided on a wall surface of each ink chamber 252 (the top part in the example shown in FIG. 2). If a voltage is applied to one of the piezoelectric elements, the piezoelectric element is deformed and thus deforms the wall surface of the ink chamber 252 (the top part in the example shown in FIG. 2). Consequently, ink in the ink chamber 252 is pushed out and ejected as ink droplets from an ink nozzle 256.

Figure 3:
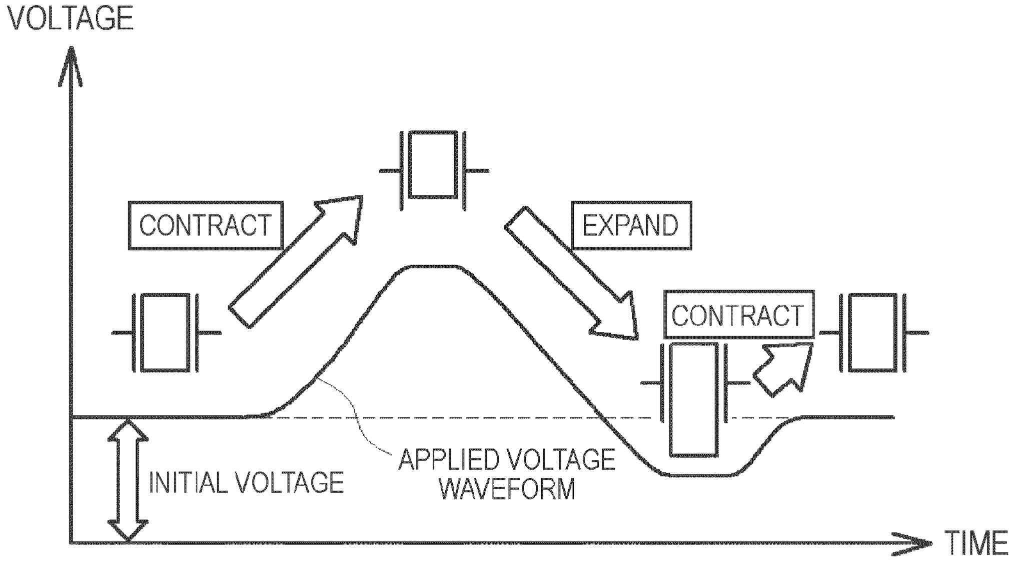
FIG. 3 is an explanatory view showing an exemplary voltage waveform applied to a piezoelectric element in the ejection head.

FIG. 3 is an explanatory view showing an exemplary voltage waveform applied to the piezoelectric element 254. In the ejection head 250 of the ink jet printer, a trapezoidal voltage waveform as shown in FIG. 3 (a waveform such that the voltage rises with time and then falls to restore the original voltage) is applied to the piezoelectric element 254 and ink droplets are thus ejected. As such a voltage waveform is applied, the piezoelectric element 254 first contracts and ink is sucked into the ink chamber 252. After that, the piezoelectric element 252 expands and pushes ink out of the ink chamber 252. Thus, ink droplets are ejected from the ink nozzle 256. After that, the initial state is restored. As ink droplets are ejected by repetition of such operation, an image is printed on a print sheet.

As clear from the above description, in the ejection head 250, if the voltage waveform applied to the piezoelectric element 254 changes, the quantity of ink sucked into the ink chamber 252 and the quantity of ink pushed out of the ink chamber 252 change, and consequently the size of ink droplets to be ejected changes. Therefore, in the ink jet printer, it is normal to use various voltage waveforms properly in accordance with the size of ink droplets to be ejected.

B. Method of Driving Electric Load

FIG. 4A to FIG. 4D are explanatory views showing a method in which the electric load driving circuit 100 of this embodiment drives the electric load 200. It is now assumed that a voltage waveform as shown in FIG. 4A is applied to the electric load 200. The electric load driving circuit 100 is provided with the three power sources 110*a*, 110*b* and 110*c*. It is assumed that the power sources 110*a*, 110*b* and 110*c* generate voltages Va, Vb and Vc, respectively (where 0<Va<Vb<Vc holds).

FIG. 4B shows the switching of the switches SWa, SWb, SWc and SWg by the switch control unit 130. For example, since the voltage to be applied is initially 0 V (GND), the switch SWg is on (all the other switches are off). Next, if the switch SWg is turned off and the switch SWa is turned on, the capacitor 120*a* (the capacitor indicated by Ca in FIG. 1) is connected and a voltage Va is applied to the electric load 200. After the lapse of a predetermined time, the switch SWa is turned off and the switch SWb is turned on. Then, the capacitor 120*b* (the capacitor indicated by Cb in FIG. 1) is connected and a voltage Vb is applied to the electric load 200. As the switches SWa, SWb, SWc and SWg are switched one after another in this manner, the voltage waveform as shown in FIG. 4A can be applied to the electric load 200.

FIG. 4C shows the delivery of electric charges between each capacitor and the electric load 200 according to the above switching of the switches SWa, SWb, SWc and SWg. For example, when the applied voltage to the electric load 200 is 0V, no electric charges are delivered. However, if the switch SWa is turned on to raise the applied voltage from 0 V (GND) to Va, electric charges are supplied to the electric load 200 from the capacitor Ca. That is, as electric charges from the capacitor Ca are supplied to the capacity component of the electric load 200, the applied voltage to the electric load 200 is raised. In FIG. 4C, the inflow of electric charges from the capacitor Ca to the electric load 200 at the time of raising the applied voltage from 0 V to Va is indicated by a solid-white arrow.

If the switch SWb is turned on to raise the applied voltage from Va to Vb, electric charges are supplied to the electric load 200 from the capacitor Cb in turn. After that, when the switch SWc is turned on, electric charges are similarly supplied to the electric load 200 from the capacitor Cc. In this manner, in the case of raising the applied voltage to the electric load 200, electric charges are supplied to the electric load 200 from the capacitors.

Next, in order to lower the applied voltage to the electric load 200 from Vc to Vb, the switch SWc is turned off and the switch SWb is turned on to connect the capacitor Cb with the electric load 200, as shown in FIG. 4B. Immediately after the switches are changed over, the applied voltage to the electric load 200 is Vc and the terminal voltage of the capacitor Cb is Vb. Therefore, electric charges stored in the electric load 200 flows into the capacitor Cb. In FIG. 4C, the inflow of electric charges from the electric load 200 to the capacitor Cb at the time of lowering the applied voltage from Vc to Vb is indicated by a shaded arrow.

Moreover, in the case of lowering the applied voltage to the electric load 200 from Vb to Va, the switch SWb is turned off and the switch SWa is turned on. Then, electric charges stored in the electric load 200 flow into the capacitor Ca. At the time of lowering the applied voltage to the electric load 200 in this manner, electric charges flow into the capacitor from the electric load 200. In FIG. 4A to FIG. 4D, the portions indicating the inflow of electric charges from the electric load 200 to the capacitors are shaded.

FIG. 4D shows delivery of electric charges between each capacitor and the electric load 200 in terms of the individual capacitors. For example, with respect to the capacitor Ca, when initially raising the applied voltage from 0 V to Va, the capacitor Ca supplies electric charges to the electric load 200. After that, the capacitor Ca constantly receives electric charges from the electric load 200. As for the capacitor Cb, supplying electric charges to the electric load 200 and receiving electric charges from the electric load 200 occur almost in the same proportion. The capacitor Cc constantly supplies electric charges to the electric load 200.

As for the capacitor Cb, since supply of electric charges and reception of electric charges are carried out almost in the same proportion, increase or decrease of electric charges stored in the capacitor Cb is very small in the long term. Therefore, if the capacitor Cb is provided with a large capacity, fluctuation in the terminal voltage can be restrained to a practically insignificant level.

As for the capacitor Cc, since electric charges are supplied one-sidedly to the electric load 200, the more the electric load 200 is driven, the less electric charges are stored in the capacitor Cc. However, the capacitor Cc can receive supply of electric charges from the power source 110*c* (the power source referred to as power source C in FIG. 1). Therefore, the terminal voltage of the capacitor Cc does not greatly vary, either. Meanwhile, the capacitor Ca only receives electric charges one-sidedly from the electric load 200 after initially supplying electric charges. Therefore, the more the electric load 200 is driven, the more electric charges are stored in the capacitor Ca. Consequently, the terminal voltage of the capacitor Ca gradually rises, making it difficult to drive the electric load 200 properly.

Figure 5A:
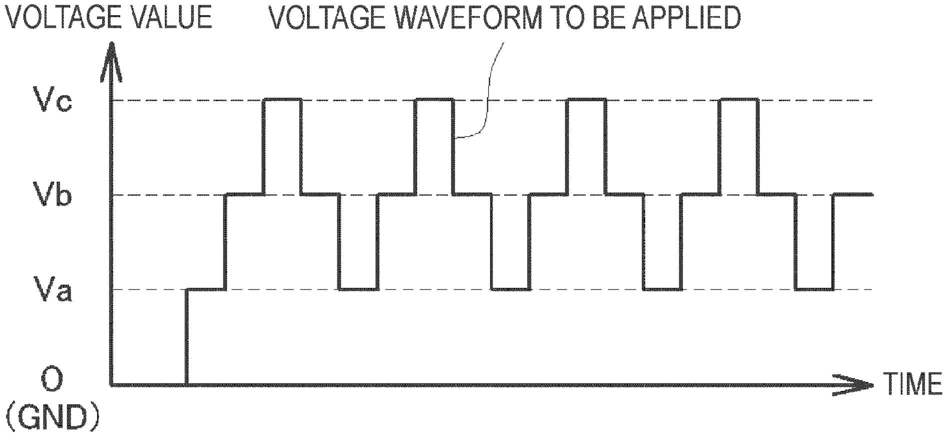
FIG. 5A to FIG. 5C are explanatory views showing a rise in terminal voltage of a capacitor caused by driving of the electric load.
Figure 5B:
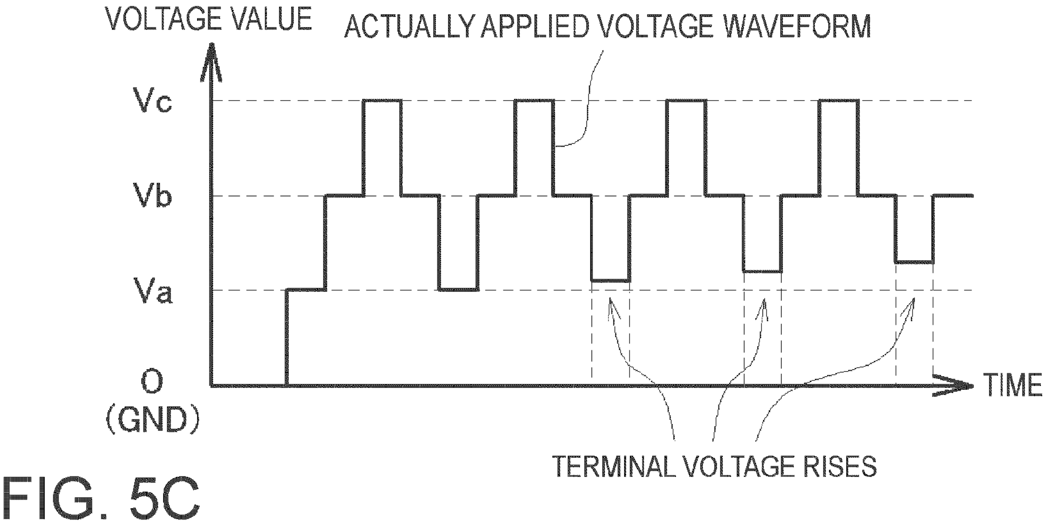
Figure 5C:
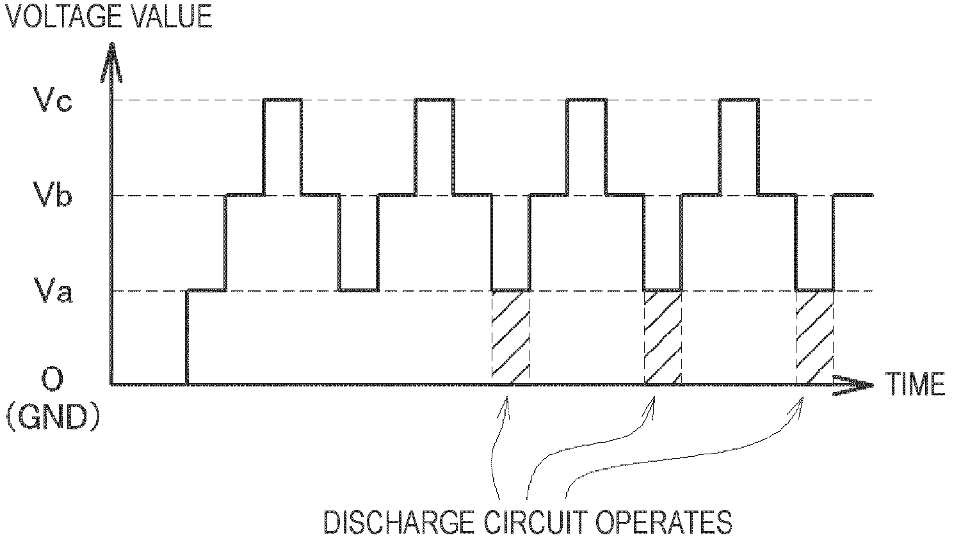

FIG. 5A to FIG. 5C are explanatory views showing rise of the terminal voltage of a capacitor by the driving of the electric load 200. FIG. 5A shows a voltage waveform to be applied. If such a voltage waveform is supplied while the capacitors Ca, Cb and Cc are switched, electric charges stored in the capacitor Ca are increased as described above with reference to FIG. 4A to FIG. 4D, and the terminal voltage of the capacitor Ca gradually rises accordingly. Consequently, the voltage waveform at the parts where the voltage Va should be applied gradually rises, as shown in FIG. 5B, and a proper voltage waveform cannot be applied.

In the electric load driving circuit 100 of this embodiment, in order to avoid this, a discharge circuit is provided for each capacitor. In the voltage waveform shown in FIG. 5B, the terminal voltage rises while the electric load 200 is connected to the capacitor Ca in order to lower the applied voltage from Vb to Va. Therefore, during this period, the discharge circuit 142*a* is made to operate to release electric charges to the ground from the capacitor Ca. In this way, excessive accumulation of electric charges in the capacitor Ca can be avoided. As a result, the electric load 200 can be driven without raising the terminal voltage of the capacitor Ca, as shown in FIG. 5C.

Figure 6A:
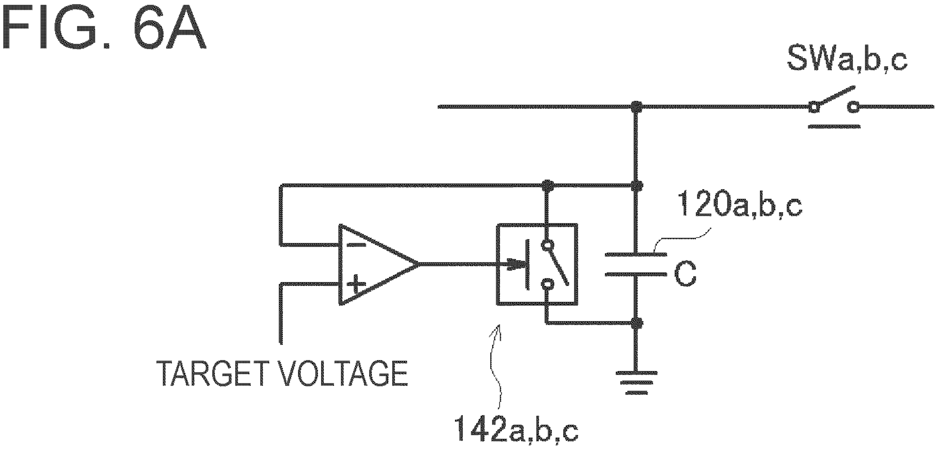
FIG. 6A to FIG. 6C are explanatory views showing an exemplary method of controlling the quantity of electric charges discharged from the capacitor.
Figure 6B:
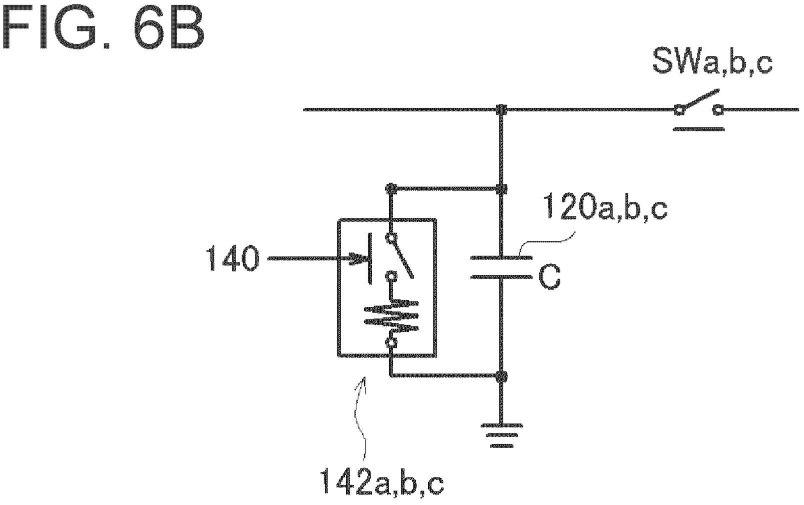

The quantity of electric charges discharged from the discharge circuit 142 can be controlled by various methods. As a simple technique, the quantity of electric charges to be discharged can be controlled while feedback control is performed so that the terminal voltage of the capacitor reaches a target voltage, as shown in FIG. 6A. More simply, a fixed resistor having a relatively large resistance value and an ON/OFF switch may be connected to the two terminals of the capacitor, as shown in FIG. 6B. Then, at the time of lowering the applied voltage, the ON/OFF switch may be turned on only when the electric load 200 is connected to this capacitor. In this manner, electric charges can be discharged little by little only when electric charges flow into the capacitor, and excessive accumulation of electric charges in the capacitor can be avoided.

Figure 6C:
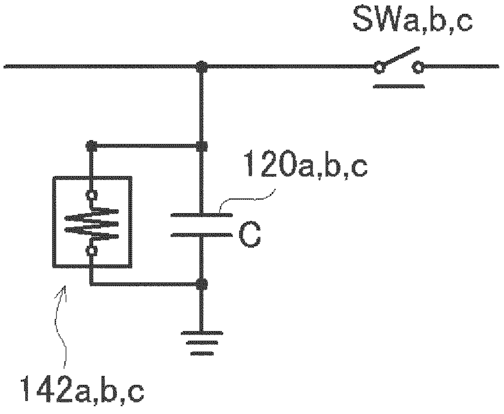

Moreover, the two terminals of the capacitor may be connected via a sufficiently large resistance value, as shown in FIG. 6C. In this case, electric charges stored in the capacitor are constantly discharged little by little. However, if the voltage waveform applied to the electric load 200 is predetermined and the quantity of electric charges stored in the capacitor can be estimated, it is possible to avoid excessive accumulation of electric charged in the capacitor by selecting an appropriate resistance value. Consequently, the electric load 200 can be driven constantly in a stable and efficient manner while the plural capacitors are switched.

C. Modified Embodiments

There are several modifications of the electric load driving circuit 100 of the above-described embodiment. Hereinafter, these modified embodiments will be briefly described.

C-1. First Modified Embodiment

In the above embodiment, it is assumed that when the electric load 200 with a low applied voltage is connected to a capacitor, the discharge circuit 142 of that capacitor is made to operate. However, the timing of making the discharge circuit 142 to operate and discharge electric charges is not limited to the above timing.

Figure 7A:
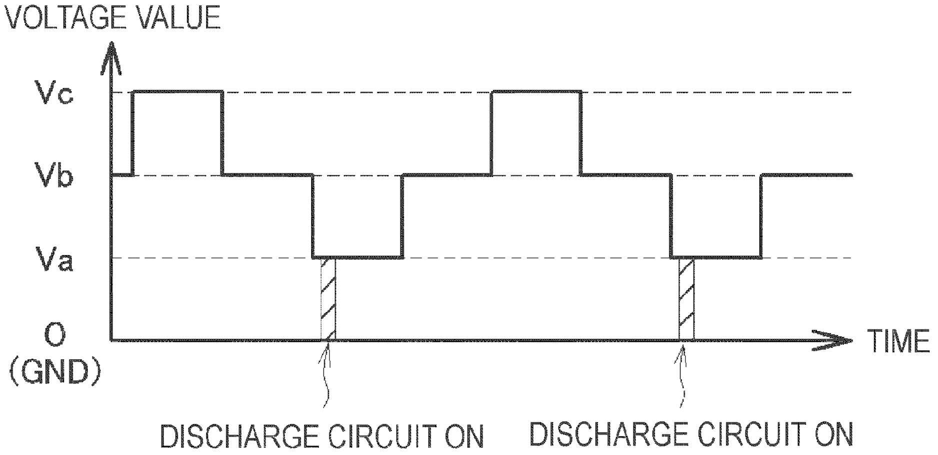
FIG. 7A to FIG. 7C are explanatory views showing an exemplary method of controlling the quantity of electric charges discharged from the capacitor in an electric load driving circuit according to a first modified embodiment.

For example, if a slower voltage waveform is applied, as shown in FIG. 7A, the electric load 200 may be connected to one capacitor for a long period of time. In such a case, the discharge circuit 142 may be made to operate only during a partial period of the period when the capacitor is connected to the electric load 200. In this case, a large quantity of electric charges flows into the capacitor for a while after the switch is changed over and the electric load 200 is connected to the capacitor. Therefore, the discharge circuit 142 may be made to operate during this period alone.

Figure 7B:
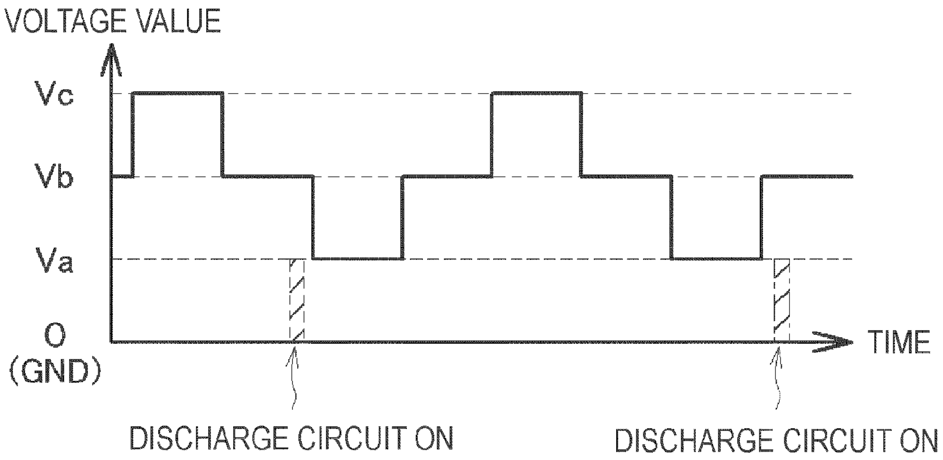

Moreover, the discharge circuit 142 may be made to operate before the capacitor is connected to the electric load 200. Thus, the capacitor may be connected to the electric load 200 after electric charges in the capacitor are discharged in advance. Alternatively, the discharge circuit 142 is not made to operate while the capacitor is connected to the electric load 200, and after the electric load 200 is disconnected, the discharge circuit 142 may be made to operate to discharge excessively accumulated electric charges. FIG. 7B shows an example of such a case. In this manner, if the discharge circuit 142 is made to operate in the timing when the capacitor is not connected to the electric load 200, it is possible to avoid change in the terminal voltage of the capacitor due to the operation of the discharge circuit 142 and hence change in the voltage applied to the electric load 200 due to the influence of the terminal voltage change.

Figure 7C:
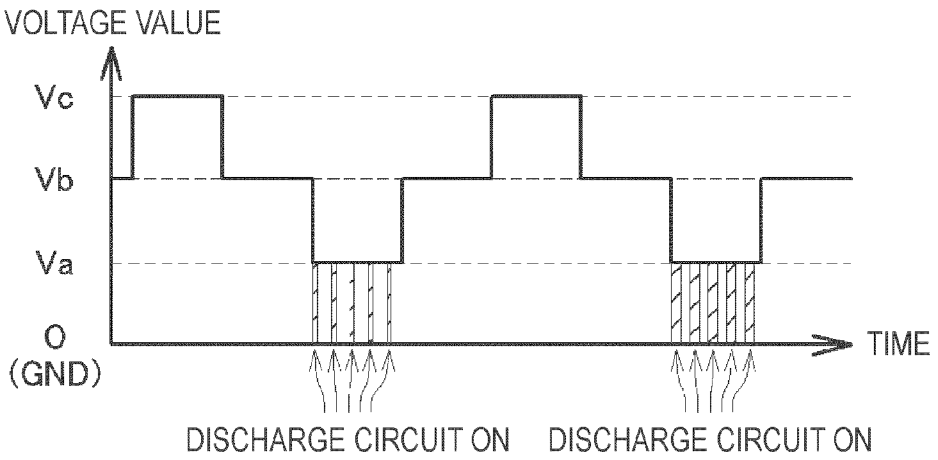

Alternatively, the proportion between the period when the discharge circuit 142 is on and the period when the discharge circuit 142 is off may be changed to control the quantity of discharged electric charges, as shown in FIG. 7C. That is, as the proportion of the period when the discharge circuit 142 is on increases, the quantity of discharged electric charges increases. On the other hand, as the proportion of the period when the discharge circuit 142 is on decreases, the quantity of discharged electric charges decreases. Therefore, the terminal voltage of the capacitor may be detected and the ON/OFF proportion may be controlled in accordance with the result of the detection. Alternatively, if the applied voltage waveform is predetermined, the quantity of electric charges stored in each capacitor can be estimated. Therefore, ON/OFF operation of the discharge circuit 142 may be controlled according to the proportion corresponding to the estimated quantities of electric charges.

C-2. Second Modified Embodiment

In the above embodiment and the first modified embodiment, it is assumed that the voltage generated by each power source has a substantially equal voltage difference. However, the voltage generated by each power source need not necessarily be set with an equal voltage difference. Moreover, the generated voltage may be changeable.

Figure 8A:
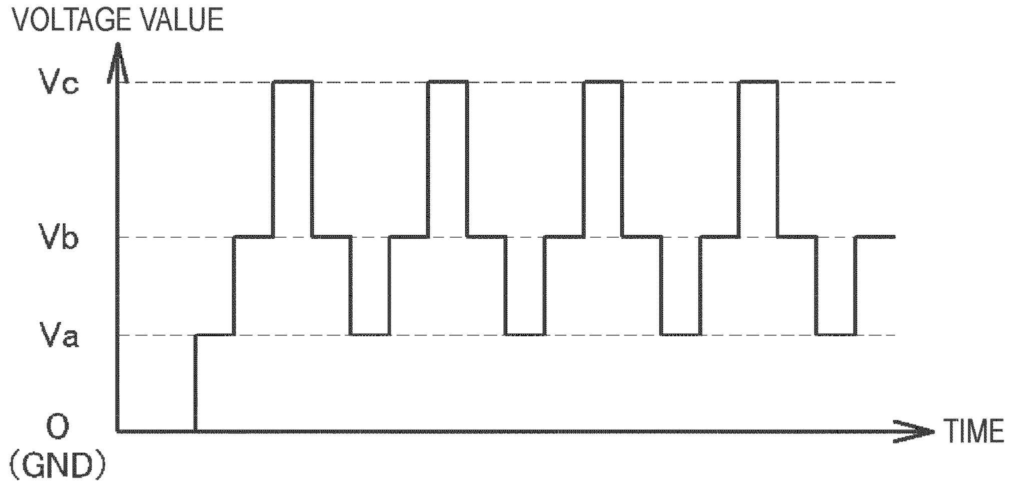
FIG. 8A and FIG. 8B are explanatory view showing an example in which an electric load driving circuit according to a second modified embodiment drives an electric load.
Figure 8B:
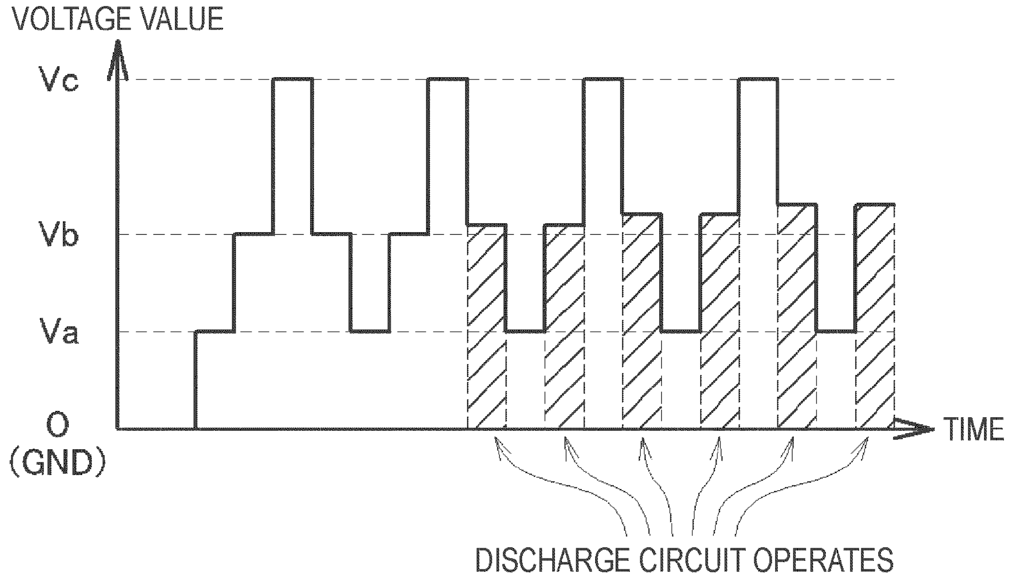

FIG. 8A and FIG. 8B show an example of driving the electric load 200 by using a voltage waveform in which the voltage difference between the voltage Vb generated by the power source 110*b* (power source B shown in FIG. 1) and the voltage Vc generated by the power source 110*c* (power source C shown in FIG. 1) is set to be broader than the other voltage differences between power sources (for example, the voltage difference between Va and Vb, or the voltage difference between GND and Va). For example, in the ink jet printer, ink that is temporarily sucked into the ink chamber 252 is pushed out and ink droplets are ejected (see FIG. 2 and FIG. 3).

Therefore, this setting occurs, for example, in the case of changing the voltage applied to the piezoelectric element 254 to a higher voltage in order to suck a large amount of ink and eject large ink droplets.

Also in the case of applying the voltage waveform as shown in FIG. 8A to the electric load 200, the switches SWa, SWb, SWc and SWg can be switched to apply the voltage, as in the case of applying the voltage waveform of FIG. 4A to FIG. 4D. Therefore, as described above with reference to FIG. 4D, in the capacitor 120*b*, the period when electric charges are supplied to the electric load 200 and the period when electric charges are received from the electric load 200 exist substantially in the same proportion. However, since the voltage difference at the time of lowering the applied voltage from the voltage Vc to the voltage Vb is greater than the voltage difference at the time of raising the applied voltage from the voltage Va to the voltage Vb, as shown in FIG. 8A, the quantity of electric charges received by the capacitor 120*b* is greater than the quantity of electric charges supplied by the capacitor 120*b*. Consequently, the terminal voltage of the capacitor 120*b* gradually rises and an accurate voltage waveform cannot be applied, as indicated by the bold solid line in FIG. 8B.

However, even in such a case, by making the discharge circuit 142*b* provided in the capacitor 120*b* to operate and thus discharging excessive electric charges from the capacitor 120*b*, it is possible to avoid the rise in the terminal voltage and apply an appropriate voltage waveform.

C-3. Third Modified Embodiment

In the above embodiment and first and second modified embodiments, it is assumed that any of the discharge circuits 142 discharges electric charges accumulated in the capacitor 120 to the ground. However, electric charges may be discharged to another capacitor having a lower terminal voltage, instead of the ground.

Figure 9:
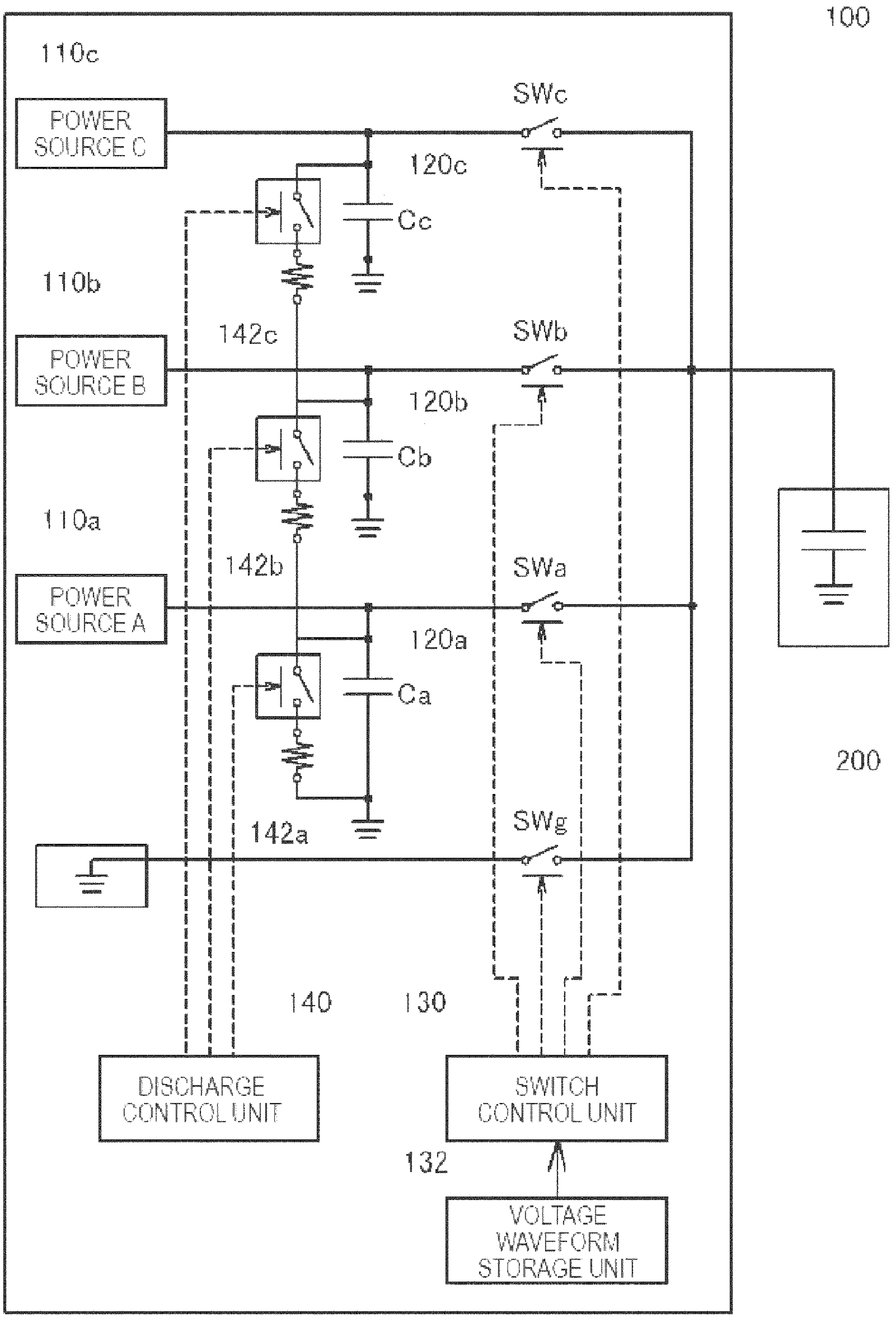
FIG. 9 is an explanatory view showing an electric load driving circuit according to a third modified embodiment.

FIG. 9 is an explanatory view showing an electric load driving circuit according to a third modified embodiment in which excessive electric charges accumulated in a capacitor are discharged to another capacitor. In the example shown in FIG. 9, if excessive electric charges are accumulated in the capacitor 120*c*, the electric charges can be discharged to the capacitor 120*b* via the discharge circuit 142*c*. If excessive electric charges are accumulated in the capacitor 120*b*, the electric charges can be discharged to the capacitor 120*a* via the discharge circuit 142*b*. Each of the discharge circuits 142*a*, 142*b* and 142*c* is provided with a switch and the operation of the discharge circuits 142*a*, 142*b* and 142*c* can be controlled by the discharge control unit 140.

In this manner, even if a capacitor becomes short of electric charges and consequently has a lowered terminal voltage, excessive electric charges can be supplied thereto from another capacitor having a higher terminal voltage. Thus, the shortage of electric charges can be compensated for and the lowering of the terminal voltage can be avoided. If electric charges can be supplied from another capacitor in this manner, electric charges need not be supplied from the power source and therefore power efficiency in driving the electric load 200 can be improved further.

Moreover, if a resistor is inserted in each discharge circuit and these resistors are connected in series, as shown in FIG. 9, the terminal voltage of each capacitor can be stabilized by the following mechanism and consequently a more accurate voltage waveform can be applied to the electric load 200. That is, if the switches of all the discharge circuits 142*a*, 142*b* and 142*c* are turned on, the resistors in the discharge circuits become connected in series and therefore the voltage difference between the terminal voltage (Vc) of the capacitor 120*c* and GND is divided by each resistor. Therefore, if the resistance value of each resistor (or the proportion of resistance values) is properly set and the switches of all the discharge circuits 142*a*, 142*b* and 142*c* are turned on at a time, the terminal voltage of each capacitor may be corrected to an appropriate voltage.

The electric load driving circuit according to the embodiment is described above. However, the invention is not limited to the embodiment and modified embodiments and can be carried out in various forms without departing from the scope and spirit of the invention.

For example, a switch may be provided between each power source and a capacitor. The switch can be connected only when necessary so that electric charges may be supplied from the power source to the capacitor.

What is claimed is:

1. An electric load driving circuit for driving a single electric load having a capacity component, the electric load driving circuit comprising:
- a plurality of power sources generating different voltages;
- a plurality of capacitors, each corresponding to a power source of the plurality of power sources, the plurality of capacitors being electrically connected in parallel to the plurality of power sources;
- a switch control unit that switches connections between the capacitors and the single electric load and thereby switches the voltage applied to the electric load;
- a plurality of discharge paths, each corresponding to a capacitor of the plurality of capacitors, each discharge path being individually and selectively controlled to connect the terminals of the corresponding capacitor to a ground so as to discharge an electric charge stored in the corresponding capacitor; and
- a discharge control unit that controls the plurality of discharge paths so as to control a quantity of electric charge discharged via the plurality of discharge paths.

2. The electric load driving circuit according to claim 1, wherein the discharge control unit detects terminal voltages of the capacitors and controls the quantity of electric charges to be discharged from the capacitors in accordance with the result of the detection.

3. The electric load driving circuit according to claim 1, further comprising a voltage waveform storage unit that stores a voltage waveform applied to the electric load,
- wherein the switch control unit switches the connections between the capacitors and the electric load in accordance with the voltage waveform, and
- the discharge control unit controls the quantity of electric charges discharged via the discharge paths in accordance with the voltage waveform.

4. The electric load driving circuit according to claim 1, wherein at least one of the discharge paths provided for each of the capacitors is a path capable of discharging electric charge stored in the capacitor to another capacitor.

5. An electric load driving circuit for driving a single electric load having a capacity component, the electric load driving circuit comprising:
- a plurality of power sources generating different voltages;
- a plurality of capacitors being electrically connected in parallel to the plurality of power sources;
- a plurality of switches, each connecting a corresponding power source and corresponding capacitor to the single electric load;

a switch control unit that switches connections between the capacitors and the single electric load and thereby switches the voltage applied to the single electric load;

a plurality of discharge paths, each corresponding to a capacitor of the plurality of capacitors, each discharge path being individually and selectively controlled to connect the terminals of the corresponding capacitor to a ground so as to discharge an electric charged stored in the corresponding capacitor and a discharge control unit that controls the plurality of discharge paths so as to control a quantity of electric charge discharged via the plurality of discharge paths.

6. An electric load driving circuit for driving a single electric load having a capacity component, the electric load driving circuit comprising:

a plurality of power sources generating different voltages;

a plurality of capacitors being electrically connected in parallel to the plurality of power sources;

a plurality of switches, each connecting a corresponding power source and corresponding capacitor to the single electric load;

a switch control unit that switches connections between the capacitors and the single electric load and thereby switches the voltage applied to the single electric load;

a plurality of discharge paths provided for each capacitor of the plurality of capacitors selectively controlled to connect one of the terminals to the other terminal of the capacitor; and a discharge control unit that controls the plurality of discharge paths so as to control a quantity of electric charge discharged via the plurality of discharge paths.

7. The electric load driving circuit according to claim 6, wherein the discharge control unit detects terminal voltages of the capacitors and controls the quantity of electric charges to be discharged from the capacitors in accordance with the result of the detection.

8. The electric load driving circuit according to claim 6, further comprising a voltage waveform storage unit that stores a voltage waveform applied to the electric load, wherein the switch control unit switches the connections between the capacitors and the electric load in accordance with the voltage waveform, and the discharge control unit controls the quantity of electric charges discharged via the discharge paths in accordance with the voltage waveform.

* * * * *